United States Patent Office 3,530,213
Patented Sept. 22, 1970

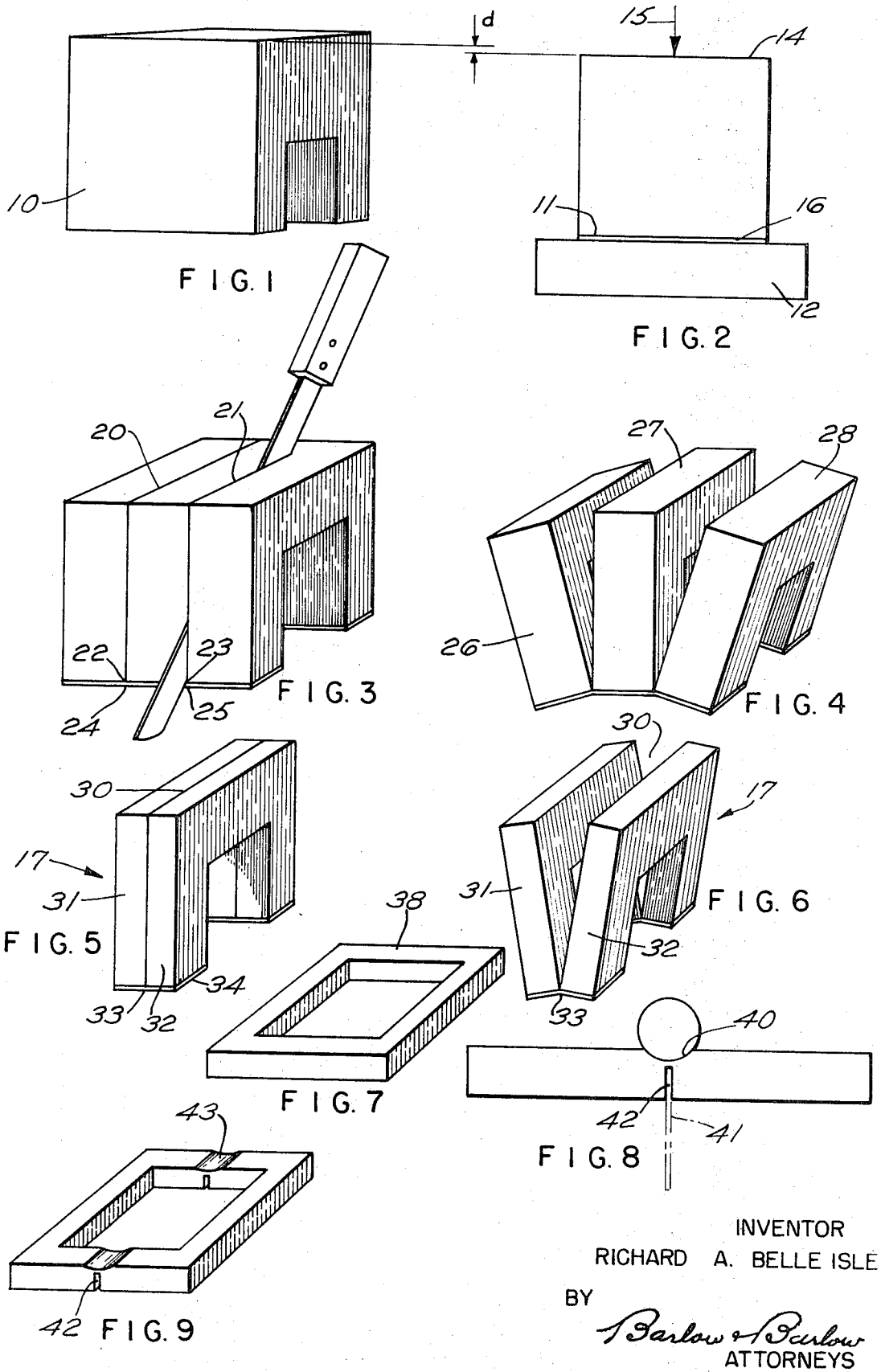

3,530,213
METHOD OF FORMING A HINGE IN A BLOCK OF FOAM POLYETHYLENE
Richard A. Belle Isle, Wilbraham, Mass., assignor to Tainer Tech Corp., a corporation of Delaware
Filed Jan. 14, 1969, Ser. No. 790,907
Int. Cl. B29c 24/00
U.S. Cl. 264—296                         4 Claims

ABSTRACT OF THE DISCLOSURE

A method of forming a hinge in a block of foam polyethylene which comprises heating one surface of the foam to melting temperature, then compressing the heated surface to densify the foam and thereafter or simultaneously slitting the foam from the opposite surface to a location close to the densified surface so that the densified portion provides a hinge between the two portions on either side of the slit.

BACKGROUND OF THE INVENTION

Cushions of foam plastic are usually formed by molding or cutting the foam plastic into the desired shape and where right angular portions are desired for the corners of articles to be packed, such a right angular form is cut or molded while at other times supporting sheets of cardboard and the like are folded and inserts are placed in different right angular portions of the cardboard, such for example as shown in Pat. 3,399,797, dated Sept. 3, 1968. Sometimes hinges have been formed for foamed plastics by preventing the plastic from expanding in areas where the hinge is to be provided or a hot bar has been used to compact the foam after the article has been formed as shown in Pat. 3,222,437.

SUMMARY OF THE INVENTION

The method of this invention is to pre-shape or preform a flexible foam article in generally block form and then to heat one surface substantially to the melting point and compressing it on a cold surface changing the foam to solid flexible form and thereafter or simultaneously with such compression cutting the foam from the opposite surface to a point closely adjacent the solid flexible formed plastic so that the solid form may serve as a hinge for folding the foam parts at right angles to each other to accommodate a rectangular box or part or shaped to receive a part which is to be packaged in a container.

BRIEF DESCRIPTION OF THE DRAWINGS

FIG. 1 is a perspective view of a block of foam material which is to be processed;

FIG. 2 is a side view showing this block after one surface has been heated to substantially the melting point as contacting a cold slab with pressure applied thereto to compress the heated face and changing the foam area adjacent that face into a substantially solid flexible form;

FIG. 3 is a perspective view illustrating the block as being severed from the face opposite the compacted solid flexible area to a point closely adjacent this solid formed area so as to divide the block in three sections;

FIG. 4 is a perspective view illustrating the sections as being relatively swung about their hinge connection formed by the solid flexible form of the compacted area;

FIGS. 5 and 6 are similar perspective views showing similar forms with the end result of two sections instead of three;

FIG. 7 is a perspective view of a frame like block;

FIG. 8 is an end view illustrating the compacting of one surface and the simultaneous cutting from the other surface to a point adjacent the compacted area; and FIG. 9 is a perspective view of the result of the operation of FIG. 8.

DESCRIPTION OF THE PREFERRED EMBODIMENTS

In FIG. 1, 10 designates a block of flexible foam plastic material, such for example as polyethylene, and which is in a form which when severed and hinged will be suitable as a cushion for packaging an article in a container, an example of which is to support the corner or edge of the article from two different directions. In order to form this cushion in sections which will be related to each other at generally right angles, a hinge is provided by heating one area of the block 11 adjacent one surface to substantially its melting point which in the case of polyethylene is substantially 250° F., and then place this heated portion upon a cold slab such as metal 12 and by exerting pressure on the opposite surface 14 as indicated by the arrow 15, densify, compact or collapse the foam plastic in the area 16 into substantially solid flexible form. Thus chilling and densification by a collapsing of the foam substantially ⅛ of an inch in the heated area provides a solid flexible area of increased strength which will act as a hinge of the block parts for right angularly relating such parts.

Subsequent to this providing of the solid flexible formation 16 or simultaneously therewith, slitting is had by means of a hot knife as at 20 and 21 to a point spaced as at 22 and 23 from the opposite edge, thereby leaving the portions 24 and 25 of the block as hinges which are tough and strong and permit the sections 26, 27 and 28 to be hinged to a right angular position in substantially three right angular planes enabling them to fit over the end and opposite sides of a right angular article to be positioned into a box or container to serve as a support and cushion for the article in the box. In some cases instead of two severing portions, a single severing as at 30 in a generally U-shape block 17 may be had to provide sections 31 and 32 with a hinge formed as at 33 by heating the edge 34 of the block as above described and densifying it at its surface.

In another case a frame structure 38 as shown in FIG. 7 is provided and then by contacting one side of the frame with a hot surface as at 40 (FIG. 8) and providing a knife of hot material as at 41, the frame may be slit as at 42 at its opposite surface to a point close to the densified area and thus provide a solid flexible portion 43 to act as a hinge.

I claim:

1. The method of providing an integral hinge connection between two portions of a polyethylene foam which comprises heating the foam to melting temperature along the surface of the foam where the hinge is desired, then compressing the heated surface to callapse and densify the foam and slitting the foam from the opposite surface to a location close to the densified portion so that the densified portion provides a hinge between the two portions on either side of the slit.

2. The method of claim 1 wherein the compression of the heated surface is sufficient to change the foam to solid flexible form.

3. The method of claim 1 wherein the slitting is done with a heated knife.

4. The method of claim 1 wherein the compressing of the heated edge is in contact with a cold surface.

References Cited

UNITED STATES PATENTS

| | | | |
|---|---|---|---|
| 2,767,436 | 10/1956 | Noland | 264—32 X |
| 3,123,656 | 3/1964 | Rochlin | 264—321 |
| 3,222,437 | 12/1965 | Schilling | 264—54 |
| 3,317,363 | 5/1967 | Weber | 264—321 X |
| 3,333,494 | 8/1967 | Smith | 83—171 X |
| 3,445,553 | 5/1969 | Hardigg | 264—45 |

DONALD J. ARNOLD, Primary Examiner

P. A. LEIPOLD, Assistant Examiner

U.S. Cl. X.R.

161—160; 264—45, 163, 321